US008337121B2

(12) United States Patent
Poerio et al.

(10) Patent No.: US 8,337,121 B2
(45) Date of Patent: Dec. 25, 2012

(54) PROCESS FOR IN-GROUND WATER COLLECTION

(76) Inventors: Wayne Poerio, Tequesta, FL (US); Malcolm Dubois, Jupiter, FL (US)

(*) Notice: Subject to any disclaimer, the term of this patent is extended or adjusted under 35 U.S.C. 154(b) by 201 days.

(21) Appl. No.: 12/716,874

(22) Filed: Mar. 3, 2010

(65) Prior Publication Data
US 2010/0266341 A1 Oct. 21, 2010

Related U.S. Application Data

(60) Provisional application No. 61/169,780, filed on Apr. 16, 2009.

(51) Int. Cl.
*E02D 19/12* (2006.01)
(52) U.S. Cl. ........................................ 405/267
(58) Field of Classification Search ............. 405/263, 405/264, 266, 267, 268, 270
See application file for complete search history.

(56) References Cited

U.S. PATENT DOCUMENTS

| | | | |
|---|---|---|---|
| 2,101,285 A | 12/1937 | Stevens | |
| 3,302,412 A | 2/1967 | Hunsucker | |
| 3,640,074 A | 2/1972 | Kopp, Jr. | |
| 3,886,705 A | 6/1975 | Cornlan | |
| 4,048,373 A | 9/1977 | Clem | |
| 4,326,818 A | 4/1982 | Willis | |
| 4,399,866 A | 8/1983 | Dearth | |
| 4,601,615 A * | 7/1986 | Cavalli | 405/267 |
| 4,877,358 A * | 10/1989 | Ressi di Cervia | 405/267 |
| 4,927,297 A | 5/1990 | Simpson | |
| 4,929,126 A * | 5/1990 | Steenbergen et al. | 405/267 |
| 4,934,865 A * | 6/1990 | Varkonyi et al. | 405/267 |
| 5,118,230 A | 6/1992 | Justice | |
| 5,360,293 A | 11/1994 | Breaux | |
| 5,423,637 A * | 6/1995 | Taki | 405/267 |
| 5,487,622 A * | 1/1996 | Cherry et al. | 405/267 |
| 5,492,434 A * | 2/1996 | Adams et al. | 405/267 |
| 5,533,833 A * | 7/1996 | Lombardi | 405/270 |
| 5,551,807 A | 9/1996 | Breaux | |
| 5,685,668 A | 11/1997 | Justice | |
| 5,758,991 A | 6/1998 | Shiosaka | |
| 5,758,993 A * | 6/1998 | Schmednecht et al. | 405/267 |
| 5,765,965 A * | 6/1998 | Carter et al. | 405/267 |
| 5,788,422 A * | 8/1998 | Gardner et al. | 405/267 |
| 5,947,644 A * | 9/1999 | Gibbons et al. | 405/267 |
| 6,139,225 A | 10/2000 | Koike | |
| 6,241,426 B1 * | 6/2001 | Schellhorn | 405/267 |
| 6,357,968 B1 * | 3/2002 | Dwyer et al. | 405/269 |
| 6,554,544 B1 * | 4/2003 | Barkasz | 405/267 |
| 6,840,710 B2 | 1/2005 | Peters | |
| 7,198,432 B2 | 4/2007 | Chen | |
| 2002/0172559 A1 * | 11/2002 | Peters et al. | 405/52 |
| 2008/0226395 A1 * | 9/2008 | Summers et al. | 405/55 |

* cited by examiner

*Primary Examiner* — Frederick L Lagman
(74) *Attorney, Agent, or Firm* — McHale & Slavin, P.A.

(57) ABSTRACT

A groundwater barrier system for preventing the generally lateral, subterranean migration of water (including both liquid and gaseous fluids) beyond an established perimeter, while providing controlled collection of same for use. The present system utilizes a barrier wall, which is formed in-ground via non-permeable membrane in sheet/roll/panel or slurry (materials can include bentonite clay). The present system will be configured to intersect the flow path of the groundwater to be routed to enhance containment or collection of the fluid. In use, the barrier of the present invention is installed by first making an excavation to accommodate the barrier system. The excavation and barrier wall is implemented to a depth so as to allow for the maximum interception with the established water table to be contained or collected, and/or processed based on benefit vs cost analysis. The barrier can also be used to prevent contaminants (including saltwater) from entering surficial freshwater aquifers.

7 Claims, 7 Drawing Sheets

Plane View

FIG 1 – Plane View

FIG 2 – SECTION 2-2 VIEW

FIG 3 – Collection View

FIG 9 – SECTION 5-5 VIEW

PROCESS FOR IN-GROUND WATER COLLECTION

CROSS-REFERENCE TO RELATED APPLICATIONS

This application is based upon and claims the priority date of provisional application No. 61/169,780 entitled "SUBTERRANEAN DAM" filed Apr. 16, 2009, the contents of which are incorporated herein by reference.

FIELD OF THE INVENTION

This invention is directed to fresh water collection and, in particular, to a process for collecting and storing of fresh water.

BACKGROUND OF THE INVENTION

It is well documented that the world is in a global drinking water crisis. The majority of Earths water is salt water, around 97%. The need for a solution to save all potential drinking water is critical as only 3% of the available water is fresh. A majority of our fresh water is found on the surface and, when left unchecked, flows into rivers and out to sea.

We cannot count on the natural cycle of rain clouds delivering rain to the ground. The ground soaks up the rain to nourish plants and flows (via water table) out to canals and the Sea. The evaporation cycle starts over and recharges the clouds. While current reverse osmosis processes can operate on high saline levels, the cost of operation is extremely high. Even if water is drawn for deep wells (below 900 ft) in an effort to avoid high saline contents, the ground can impart a high level of dissolved solids wherein the reverse osmosis pretreatment is most expensive. The Reverse Osmosis plants reoccurring costs are higher due to the need to remove/dispose salt or high levels of dissolved solids.

What is needed in the industry is an apparatus and method of in-ground collecting of water. The prior art has failed to contemplate a system as taught in the present invention. A list of prior patents which may be of interest is presented below:

| U.S. Pat. No. | Patentee(s) | Issue Date |
| --- | --- | --- |
| 6,840,710 | Peters; Stanley R. | Jan. 11, 2005 |
| 5,551,807 | Breaux; Louis B. (Marrero, LA) | Sep. 03, 1996 |
| 5,118,230 | Justice; Donald R. | Oct. 01, 1992 |
| 5,685,668 | Justice; Donald R. | Nov. 11, 1997 |
| 4,326,818 | Willis; Dudley L. (Newark, DE) | Apr. 27, 1982 |
| 4,927,297 | Simson | May 22, 1990 |
| 5,758,991 | Shiosaka; Kunio (Shizuoka, JP) | Jun. 02, 19998 |
| 2,101,285 | Stevens | Dec. 07, 1937 |
| 3,302,412 | Hunsucker | Feb. 07, 1967 |
| 3,886,705 | Cornland | Jun. 03, 1975 |
| 6,139,225 | Koike, et al. | Oct. 31, 2000 |
| 5,360,293 | Breaux, et al. | Nov. 04, 1994 |
| 4,048,373 | Clem | Sep. 13, 1977 |
| 7,198,432 | Chen | Apr. 03, 2007 |
| 4,399,866 | Dearth | Aug. 23, 1983 |
| 3,640,074 | Kopp | Feb. 02, 1972 |

U.S. Pat. No. 6,840,710 discloses an underground reservoir for storing water in alluvial deposits utilizes slurry walls keyed to an aquiclude beneath the reservoir to form a substantially impermeable water seal. A variety of water extraction/recharge apparatus provides for rapid and complete filling and draining of the underground reservoir. Such apparatus includes a plurality of wells distributed about the underground reservoir and a series of perforated pipes buried at a predetermined depth within the underground reservoir. No piping is needed to flow ground water into a collection point or well. Also there is no need for a plurality of wells. There is not a need to encircle the barrier area due to groundwater flow direction. Unlike this example it is not important that the trench must extend down so that it is "keyed" into the bedrock or other confining layer (such as clay) that runs below the alluvial deposits. Our patent is not dependent on being keyed into the bedrock. One other major difference is that our system relies on ground-flow that is not restricted on all four sides (not-contained). This approach has limited volume because it is a 360 degree perimeter (totally enclosed) and has no leakage allowable. It is too costly to cut into and below the base hardpan (more barrier and less water volume benefit.)

U.S. Pat. No. 5,551,807 discloses an in-ground barrier system the degree of containment is critical due to the desire to trap hazardous waste. Our patent relies on routing groundwater, leakage is not a problem. No guide-boxes are needed. We are able to use slurry barriers.

U.S. Pat. No. 5,118,230 discloses a leachate containment system used to surround a contaminated site such as a landfill or a hazardous chemical dump site. The impermeable membrane liner surrounds the entire site to seal migrating ground water from mixing with contaminated ground water which has been contaminated by leachate agents, passing from the hazardous material into the ground water. The system is a 360 degree entrapment, clearly different.

U.S. Pat. No. 5,685,668 discloses a delivery system includes a horizontal well to be placed alongside the liner material at any depth from four feet to the bottom depth of the liner material for free product recovery, for liquid recovery, for liquid injection, for air injection or vapor extraction. It is clearly different. Infiltration is a concern with this application. Our process does not require a fluid be put inside the liner delivery system to equalize hydrostatic head pressure. The liner delivery system discuss in U.S. Pat. No. 5,685,668 must result in keeping water out of in the inside of the barrier. The barrier material is limited to high-density polyethylene (HDPE). A lowermost edge portion of the liner material is needed to form a "J" formation on the bottom of the liner material. The "J" formation holds grout to prevent leakage in effect keying of the bottom of the liner material into an underlying layer of lower permeability. The portion would contact, for example, an impermeable clay material to complete an impermeable zone. This "J" formation is not needed.

U.S. Pat. No. 4,326,818, discloses an enclosed flexible wall extending vertically downward toward a natural aquiclude or stone base that is impermeable to water. The wall is formed by a grouting process where a grout pipe is first inserted through the soil until the pipe reaches the aquiclude and is then withdrawn while a grout material is injected under pressure from the end of the pipe. The grout material moves away from the injection zone and fills the pores of the formation where it hardens to form a grout "column." This process is repeated numerous times to form a closed perimeter wall around a defined reservoir boundary. That is, adjacent grout columns are positioned so that there is little or no space between the columns. A second and third round of grout columns are then formed adjacent the first round of columns to form a wall that is said to be substantially impermeable to water. Conventional wells and feed lines are then constructed within the boundary of the grout wall to withdraw and supply water to the reservoir as needed. The specific reservoir described in the Willis patent suffers from a number of drawbacks. Initially, the grout wall construction technique described by Willis (i.e., pressure-grouting clay or other "flexibilized" materials and allowing the grout to "jel" into place) does not typically form uniform subsurface columns. Rather, the grout material disperses from the end of the grout pipe in an uneven and haphazard manner (i.e., permeating different radial distances away from the grout pipe) as the grout pipe is retracted toward the surface. The uneven nature of the grouting process tends to form vertical sand seams between the grouted columns at the outer boundary of the pressure injection. These sand "lenses" or areas of high permeability formed between adjacent grout "columns" result in grout walls that do not form substantially impermeable water barriers and that are susceptible to relatively high levels of water leakage or seepage.

U.S. Pat. No. 4,927,297 discloses a Leak Prevention Structure—The application of the membrane is very costly and is designed for preventing hazardous waste leakage. Our system does not require the tight leakage limits. The trench configuration and structural inserts are not required. Concrete and beams are used in this slurry application and is not required for our patent.

U.S. Pat. No. 5,758,991 discloses an underground dam system includes movable opening for flow control. Our patent has a fixed level for flow control without movable parts.

U.S. Pat. No. 2,101,285 discloses a "tubular interlocking piling" of steel having interlocking structures incorporated therewith. The specification teaches the system as being used in the construction or reinforcement of coffer dams, bridge piers and the like. It is noted that the apparatus does not contemplate the utilization of a containment structure.

U.S. Pat. No. 3,302,412 to Hunsucker discloses an "interlocking sheet piles and method of installation", including means to slidingly engage and seal the sheet piles. The system is likewise obviously distinguishable from the present invention, for a variety of reasons.

U.S. Pat. No. 3,886,705 to Cornland discloses a "Hollow Structural Panel of Extruded Plastics Material and a Composite Panel Structure Formed Thereof". The patent teaches a hollow structural panel configured to form partition walls or the like and is designed for resisting deformation due to load bearing. While the '705 patent does teach the utilization of a rubber gasket for preventing leakage of snow, rain, or the like, this apparatus is unsuitable for utilization in conjunction with the system of the present invention. Apparently, the system of the '705 patent would require complete fabrication above ground prior to installation, which would make the system unsuitable for use with the preferred method of the present invention.

U.S. Pat. No. 6,139,225 discloses an underground continuous wall building method is very different. Example includes: The slanting continuous trench may be continuously excavated in a zigzag manner U.S. Pat. No. 5,360,293 discloses an in-ground barrier member interlocking joint and seal system. The locking and structural members are clearly different. It is a joint/sealing system for interlocked, in-ground barrier members which form an in-ground containment wall, including a "U" shaped gasket interfacing with a longitudinally extended male member to form oppositely.

U.S. Pat. No. 4,048,373 discloses cardboard panels and clay (bentonite). Using bentonite as a barrier has been proven effective. The panel is provided forming a water barrier and comprising two opposing spaced sheets having between said spaced sheets a sealant composition comprising bentonite; a water soluble dispersing agent. The panel is disposed against a foundation to act as a water barrier, shielding the foundation against water seepage.

U.S. Pat. No. 7,198,432 discloses a water resource recycling system includes an environmental permeable flooring which allows the rain on the ground be accumulated and quickly permeate into the underground. This approach not include an in-ground barrier system to prevent ground water leakage.

U.S. Pat. No. 4,399,866 discloses a series of wells to create a perimeter to capture rainwater and flow underground into wells. This does not benefit from unrestricted water table flow. Limits the amount of ground water flow.

U.S. Pat. No. 3,640,074 discloses a Process for Collecting and Storing Fresh Water in Earth. A thin water impermeable barrier is established in water permeable earth adjacent to the shore of a body of salt water and extended downward from the level of the high point of salt water intrusion into the water permeable earth to a nonwater-permeable earth layer. This process is very different it utilizing a series of closely spaced holes 1 in the water permeable earth throughout the length of the barrier.

SUMMARY OF THE INVENTION

The world is in a global drinking water crisis. We are running out of drinking water. The need for a solution to save all potential drinking water is critical. This patent creates a system to prevent the waste of ground water that currently flows into rivers and the Ocean out to sea. The present invention is a system for preventing the generally lateral, subterranean migration of groundwater, (including both liquid and gaseous fluids) surface rain and irrigation water from being utilized by flowing out to canals/Sea or spread so far laterally that collection is not possible. The water will be routed to an established collection point for processing as usable/potable water.

The present system utilizes a non-permeable subterranean barrier that intersects the water-table. The amount of water routed is directly related to the depth of the barrier relative to the base of the water table (non-permeable surface can be hardpan). The present system utilizes a barrier, which may be formed in-ground by creating a trench and installing a non-permeable membrane (material example includes: plastic sheeting/panels or slurry and or clay—bentonite) and routing the groundwater to a collection point. The collection point will take advantage of current water plumbing infrastructure to minimize cost/distribution.

In use, the barrier of the present invention is installed by first making an excavation to accommodate the barrier system, the excavation and barrier implemented to a depth so as to allow the interception of the established or anticipated migration path of the groundwater to be routed or collected. Once the barrier and/or collection system is installed, the open area adjacent to both sides of the barrier may be back filled. The ideal embodiment relies on surficial aquifer depths of 10-25 ft.

An objective of the invention is to reroute the groundwater before it is emptied into the Sea providing an increase in the amount of potable water.

Another objective of the invention is to lower the cost for potable water by providing a natural groundwater accumulator.

Still another objective of the invention is to prevent the generally lateral, subterranean migration of groundwater, (including both liquid and gaseous fluids) surface rain and irrigation water from being utilized by flowing out to canals/Sea or spread so far laterally that collection is not possible.

Yet another objective of the invention is to route water to an established collection point for processing as usable/potable water.

Yet another objective of the invention is to block underground fluid flow into or out of a water table.

Another objective of the invention is to prevent rainwater and groundwater runoff from leaking into rivers/ocean.

Still another objective of the invention is to establish a new water source to water stricken areas of world.

Yet still another objective of the invention is to establish a new water source that no impact on current well or aquifer groundwater supplies.

Yet still another objective of the invention is to provide better filtration of groundwater supply wherein potable water is filtered horizontally over longer distance than aquifer source.

Still another objective of the invention is to reduce the cost of drinking water, reduce or eliminate the reoccurring cost of existing Reverse Osmosis water treatment plants; and reduce the potential source of groundwater contamination into rivers/ocean.

Yet another objective of the invention is to provide a natural approach to saving everglade habitats and preventing flooding by routing of overflow.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE INVENTION

The present invention is based on analyzing ground water flow using computer aided modeling with field soil analysis. This effort will be used to determine in-ground water flow direction and amount. The in-ground water table flows based on head (hydrostatic) pressure, water flows from high ground to low. For example: in south Florida's Palm Beach county the surficial in-ground water table flow is west to southeast towards canals and Atlantic Ocean. Analysis would include determining sizing dimensions for barrier installation and direction for perimeter. Average rainfall per month in Florida is 5 inches/month. Sizing a 3 mile-3 sided perimeter would capture a minimum 1-square mile area with continuous recharging due to the fact that the west side of the perimeter is open. The maximum amount of rainfall in a 1-square mile footprint would generate 85 million gallons of potential potable water in one month. Analysis is done to determine the rate of recharge of the soil within the perimeter by looking over 5-miles upstream of the collection point (soil saturation/permeability rate vs depth) and losses that occur due to the permeability of the base materials and depth of the barrier. Analysis would include mapping soil permeability as a function of depth to quantify leakage losses due to soil layer consistency. Analysis includes determining the most cost effective method to transport captured groundwater.

The present invention is a non-permeable barrier that is placed underground at or below the water table to prevent rainwater/ground water leakage into the ocean/canals waterways and be routed to a desired location for delivery to water treatment facility or well fields/canals or irrigation systems.

Figure 1:
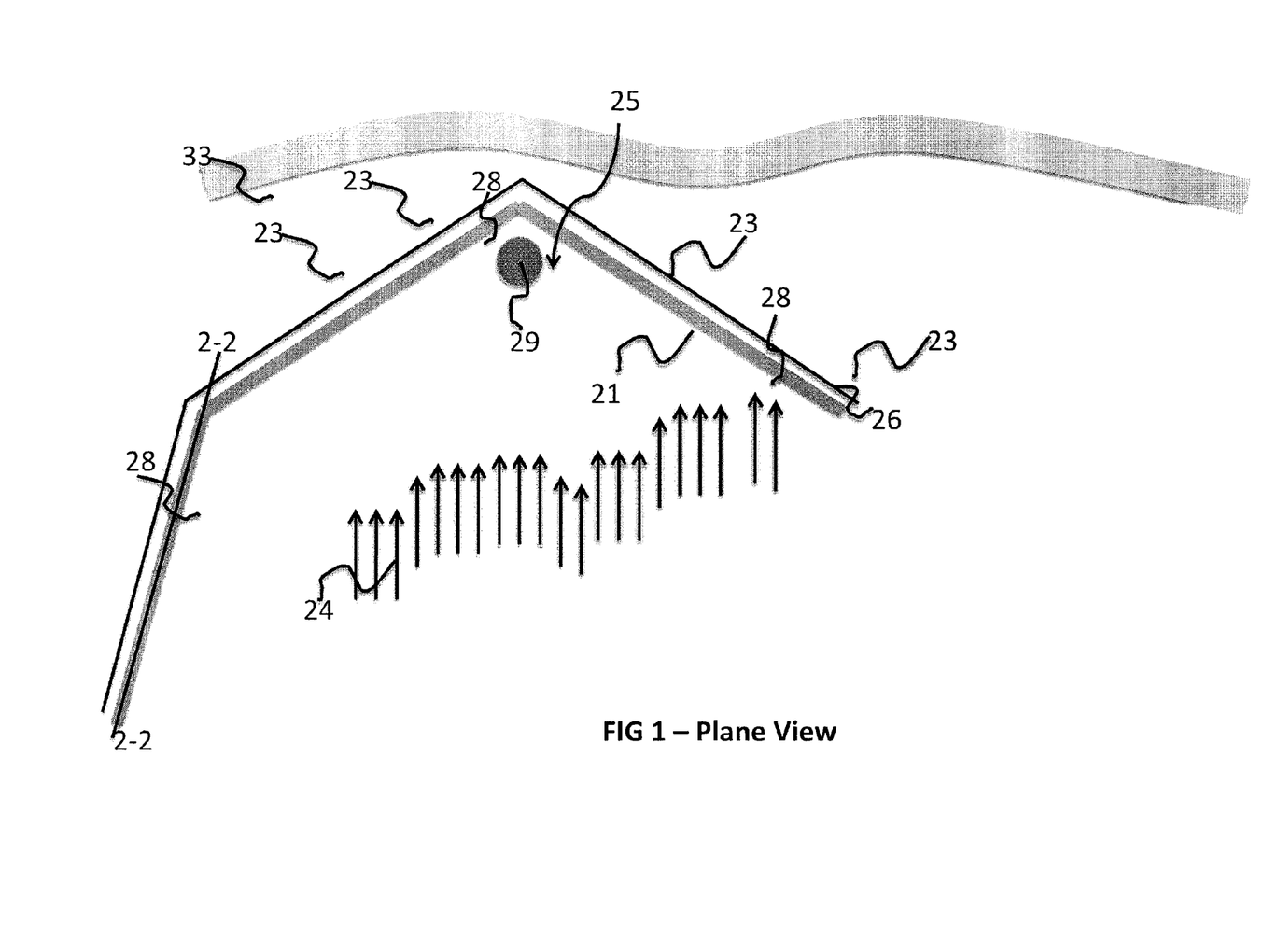
FIG. 1 is a plan view of a typical in-ground barrier system with collection point.
Figure 2:
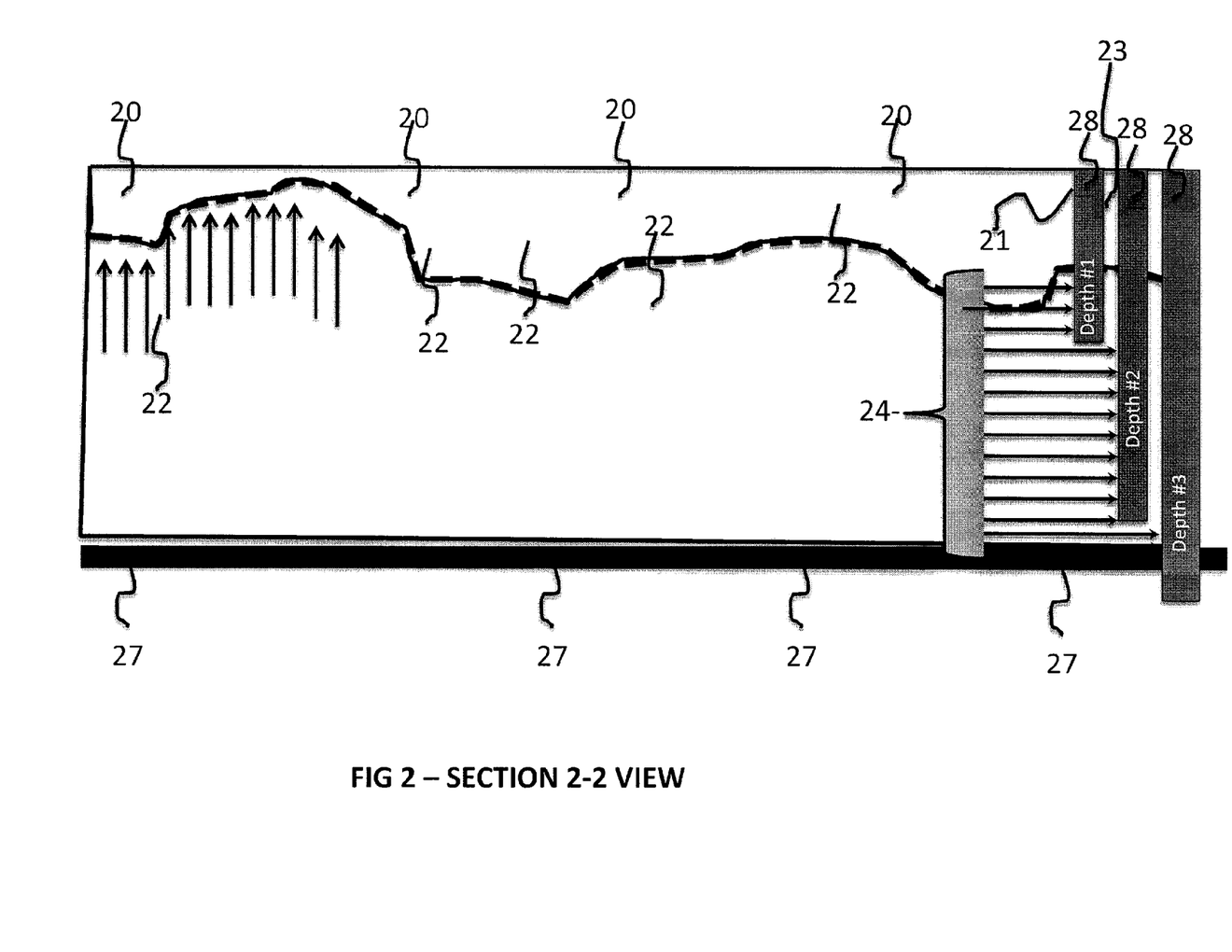
FIG. 2 is a section view of the barrier/routing taken substantially along the line 2-2 to illustrate depth of in-ground barrier impact on amount of ground water routed/saved.

Next, an excavation is made in the ground along perimeter FIG. 1-26 to the desired depth see FIG. 2 to contain or intersect the water table 22; an exemplary excavation depth could be, as an example, 12-30 feet.

The trench is lined with a non-permeable membrane in the form of plastic rolled barrier sheeting, panels, film or bentonite clay slurry and backfilled with usable trenched soil. A slurry of Benonite clay can be dispersed as the trencher moves forward for immediate installation.

The rolled barrier sheeting or film is placed in-ground, for example, to the central, rear area of the module, and the rolls are moved via dispensing the fluid impermeable sheeting or film as they are unrolled, thereby forming a generally vertically situated, horizontally dispensed barrier wall. A roll of material with an interlock or other fluid impermeable joining means, a second roll can be installed by joining with one end of the first installed roll. Subsequent rolls can likewise be similarly installed, effectively allowing for a barrier of unlimited length.

As can be seen in FIG. 1, the present invention comprises a system for intercepting, collecting and processing subterranean ground water 25 in the form of a fluid.

As shown, the placement of the present collection/barrier system is dependent upon the terrain and composition of the area to be implemented. This system can be placed anywhere that permits the ground water table to flow into it (FIG. 1) instead of leaking out to a canal/Sea/Ocean. This system can be placed along side interstates/railroads or any area that allows easy access for trenching.

FIG. 1 illustrates a direction of flow of the groundwater through the alluvial deposits 24. An underground reservoir 25 is preferably formed with a geometric boundary of maximum 3-sides—26.

FIG. 1 is a plan view of a typical collection point a typical property boundary and a perimeter of an underground water routing wall in accordance with an embodiment of the present invention. The present invention comprises placing a barrier wall 28 or the like at a depth and location to allow for the interception of the water table 22, coupled with a means to collect or distribute, which may take the form of a new or existing well/pool 29 situated for collecting/distributing groundwater.

FIG. 2 is a section view of the barrier/routing taken substantially along the line 2-2 illustrating the vertical limits of slurry walls or other non-permeable barrier—28 materials (including: plastic sheeting/rolls/panels/slurry—clay bentonite materials) used to form the underground water routing system, where the slurry walls are at a depth to create a balance between cost to trench/install barrier vs. benefit of volume of groundwater routed.

If keyed into a bedrock formation underlying the collection point it will provide maximum groundwater flow as per FIG. 2—depth#3. The cost to key into the bedrock may outway the groundwater volume gained.

Figure 3:
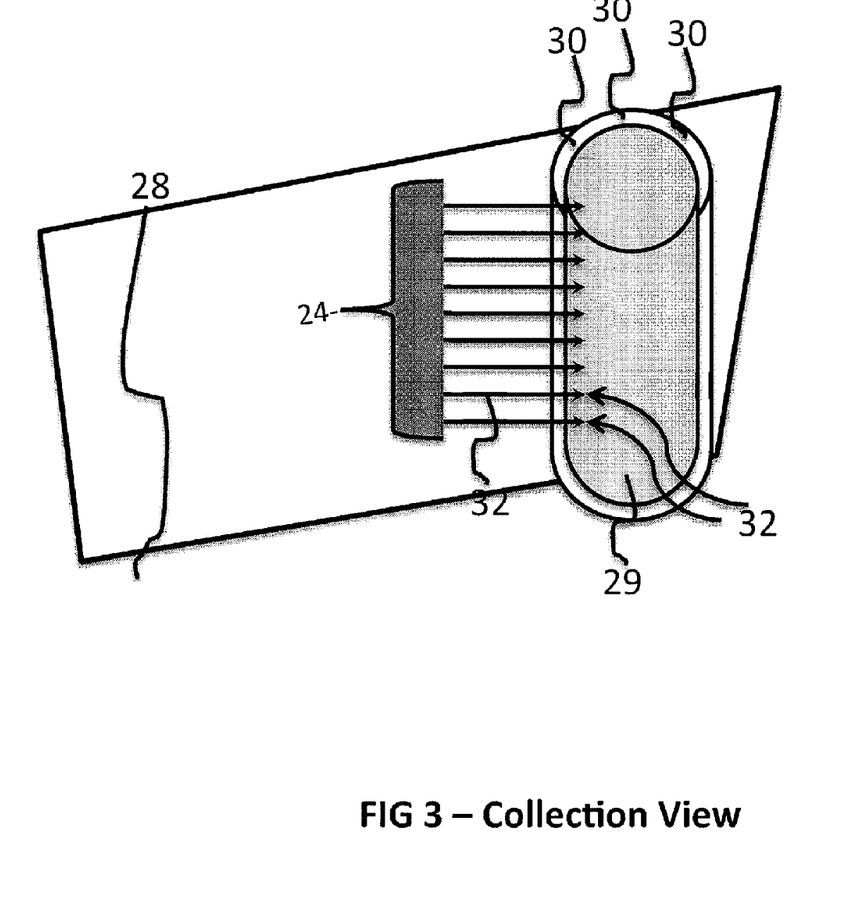
FIG. 3 Section view of details of collection point as in FIG. 1 plane view, ground water flow into well/pool.

FIG. 3 is a section view of plane view FIG. 1. This illustrates an alternative extraction system comprising a central perforated well buried within the in-ground barrier system. A permeable membrane restricts soil flow and permits groundwater flow into well.

Figure 4:
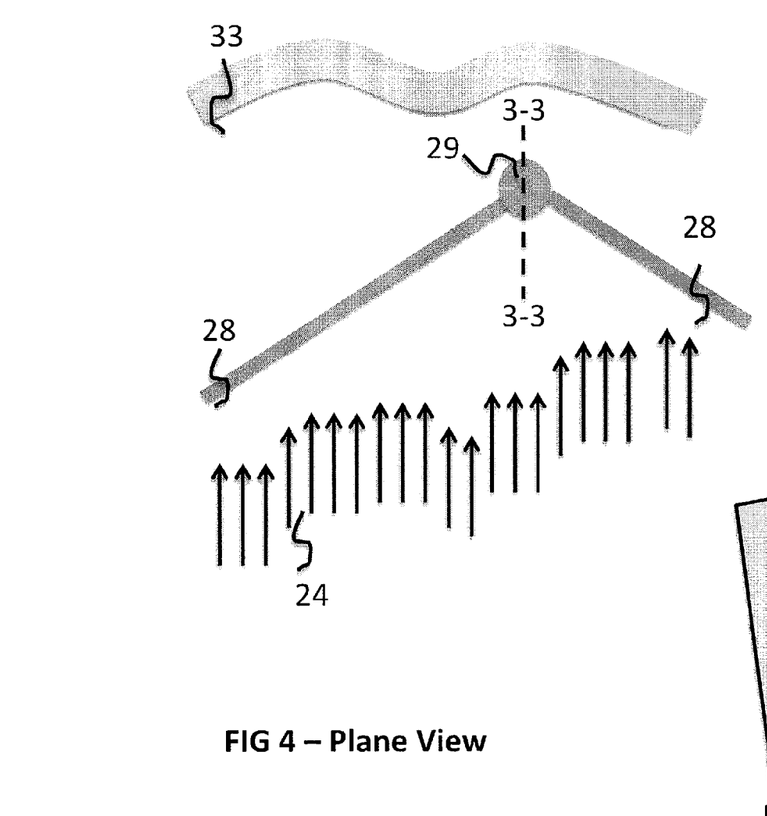
FIG. 4 is a plane view of alternate collection point method.
Figure 5:
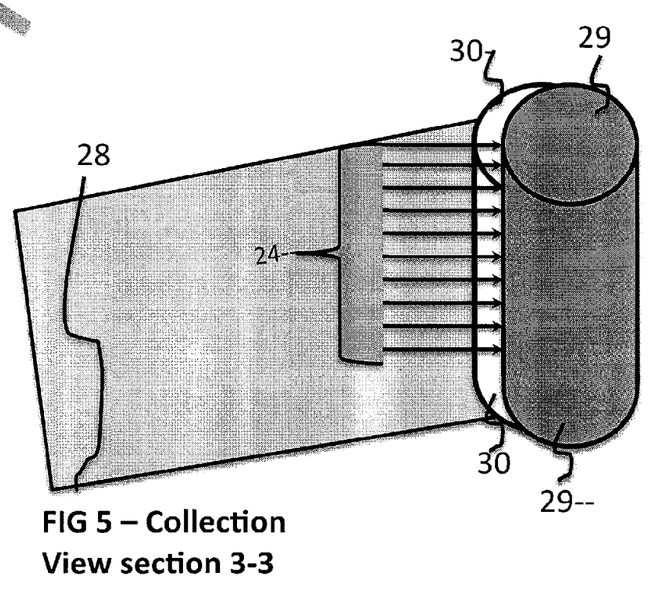
FIG. 5 is section view of FIG. 4 alternative collection point.

FIG. 4 and FIG. 5 are plane and section views illustrating flow into a collection/extraction point. FIG. 4. Illustrating an alternative extraction system comprising a central well that includes a permeable membrane that restricts soil flow and permits groundwater flow into well. The vertical in-ground barrier—26 walls are sealed against outside diameter of well.

Figure 6:
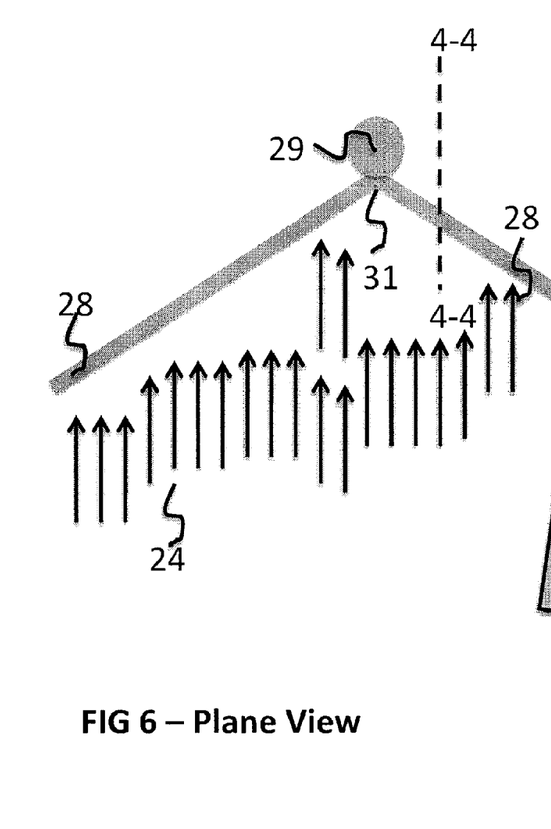
FIG. 6 is a plane view of the alternate collection point details.
Figure 7:
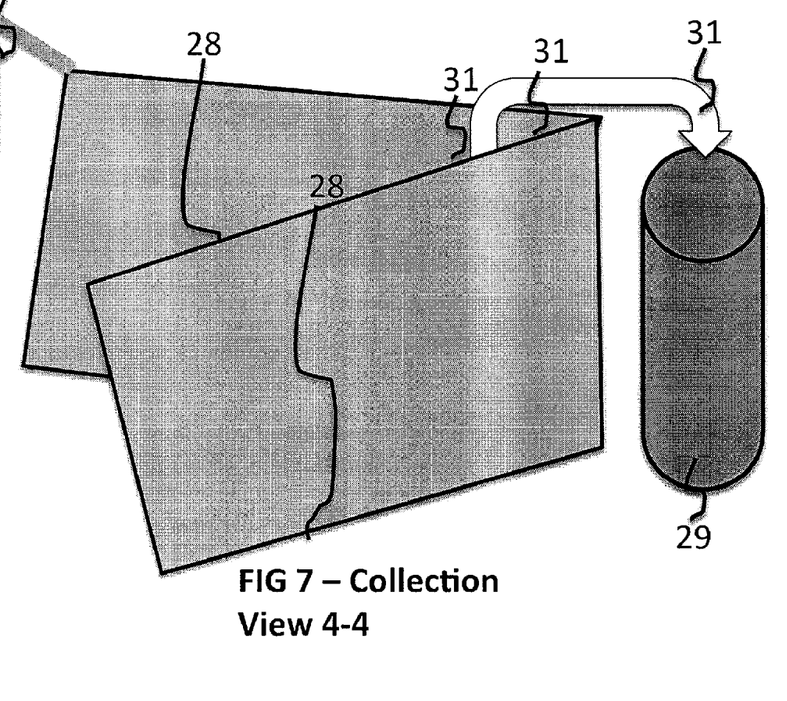
FIG. 7 is a section view of the alternate collection point details.

FIG. 6 and FIG. 7 are plane and section views illustrating flow into a collection/extraction point. FIG. 7. Illustrating line 4-4 is an alternative extraction system comprising an intersection of in-ground barrier—28 walls with central well/pool outside of pooling area that includes designed overflow into well/pool below.

Figure 8:
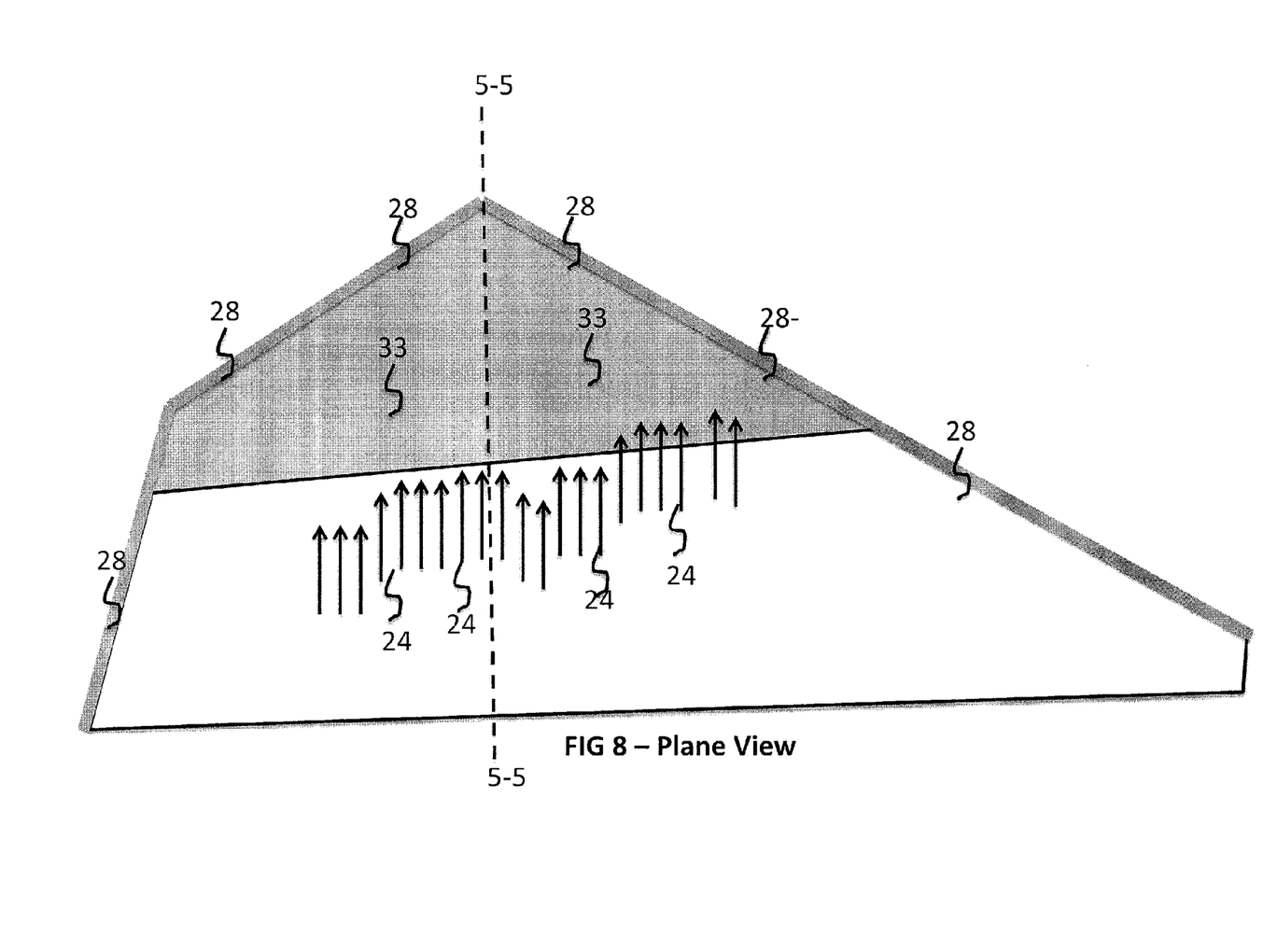
FIG. 8 is a plane view of the alternate collection point details, ground water pool.
Figure 9:
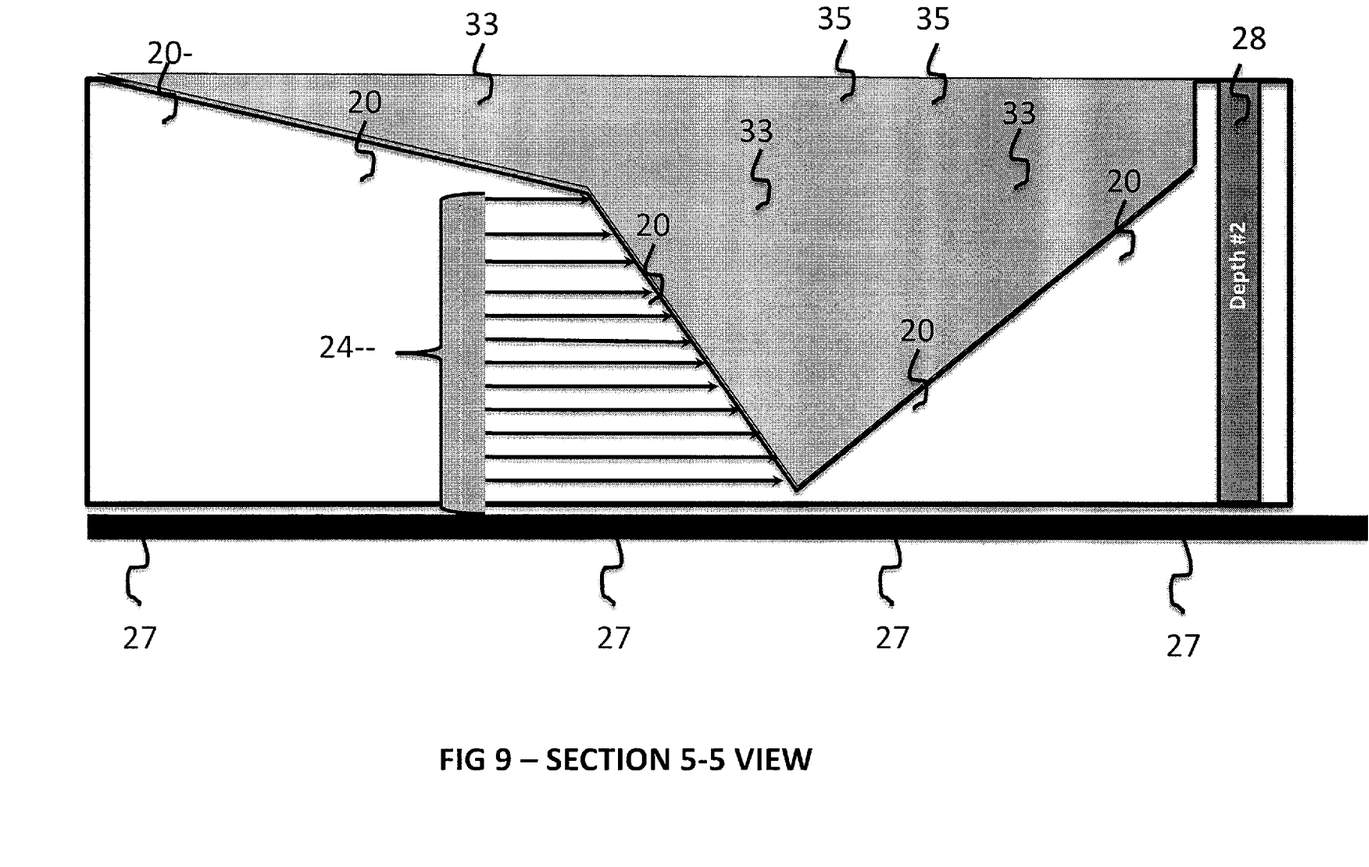
FIG. 9 is a section view illustrating a mitigation system for alternate collection point.

FIG. 8 and FIG. 9 are plan and section views taken substantially along line 5-5 creates a surface pool of groundwater that can be extracted using pump system to distribute/route for use.

FIG. 9 illustrates the utilization of a suction means, such as a pump 35 or the like in conjunction with the open reservoir 33 in order to direct the alluvial ground water 25 in a direction toward the distribution/processing, irrigation of lost ground water.

FIG. 2 illustrates a section view of the in-ground barrier including the lateral and vertical limits of the reservoir 25. FIG. 2 further illustrates that the reservoir 25 is preferably formed by a non-permeable membrane (plastic sheeting/panels/roll or slurry wall) 28 that is can be keyed into bedrock 27 however it is not necessary or extend below. With respect to impeding groundwater flow, the wall 28 provides a number of benefits.

Initially, it is noted that the wall 28 may be formed in a variety of manners and with a variety of materials. The most typical construction technique for forming a slurry wall is a trench technique that involves excavating a narrow trench that is immediately and concurrently filled with a fluid "slurry" that exerts hydraulic pressure against the trench walls to prevent the trench from collapsing as it is formed. While different materials may be used to form the slurry, bentonite clay mixed with water is the preferred slurry for use in constructing the slurry walls 28. This is because the bentonite tends to coat the walls of the trench, thereby preventing the water from being absorbed through the trench walls prior to the formation of the slurry wall 28. Additionally, the bentonite coating helps to enhance (i.e., reduce) the final permeability of the slurry wall 28.

Slurry wall trenches may be several feet wide and can be dug in excess of 100 feet deep with the use of specialty excavation equipment. For cost purposes the slurry walls will be limited based on permeability/cost analysis. Shallower trenches may be formed with conventional backhoes. It is important to remember that the trench may extend down so that it is "keyed" into the bedrock 27 or other confining layer (such as clay) that runs below the alluvial deposits 24. In one preferred embodiment, the trench is keyed at least three feet deep into the bedrock 27. The slurry-filled trench is then backfilled with a mixture of the previously excavated soil and additional quantities of bentonite. That is, the soil-bentonite mixture is used to fill the open trench where the mixture displaces the water-bentonite slurry and hardens to form the final "slurry wall" 28. Care must be taken with this technique to ensure an even backfill and avoid the presence of any voids in the wall or the collapse of any of the untreated soil back into the trench, either of which can form "windows" of relatively high permeability within the wall. With a carefully controlled backfill, soil-bentonite slurry walls having average permeability rates on the order of $1 \times 10^{-6}$ centimeters/sec ("cm/sec") are obtainable, although permeability rates as low as $1 \times 10^{-8}$ cm/sec may also be obtained with a proper soil-bentonite mixture.

While five separate wells 40 are shown in FIG. 3, it is understood that a larger or smaller number of wells 40 may be used depending on the size of the reservoir 32 and the nature of the soil found within the reservoir (i.e., the resistance of the soil to an unimpeded flow of water).

Once the reservoir 25 is emptied of the "public" water, the same wells 29 may be used to recharge the reservoir 25 with water that is owned by the particular entity or municipality that owns the reservoir 25.

The system shown in FIG. 9 permits withdrawal and recharge of the reservoir water at a much faster rate than the gravity systems of FIG. 3, 4, 5, 6, 7, due primarily to the greater surface area covered by the size of the pooling area compared to the well size 29.

The perforated well/pool 29 is also wrapped with a suitable geotextile fabric, or a combination of processed gravel and geotextile fabrics. Wrapping and supporting the perforated well/pool 29 in this manner decreases the resistance and increases the flow of water through the well/pool 29 network while simultaneously reducing the likelihood that the well/pool walls will become clogged by sediment deposits.

However, positioning the holes/pass-through 32 at a relatively shallow depth limits the amount of ground water 24 from flow into well/pool 29. Thus, the appropriate depth for the network of holes/pass-through 32 shown in FIG. 3 will vary with the surface use of the land. Of course, where it is economically feasible, the systems shown in FIGS. 3, 5, 7 and 9 will be utilized bas on land use and cost to install.

FIG. 2 includes a first dashed line 22 that indicates a historic average groundwater level. These levels may be determined prior to the construction of the in-ground barrier system to determine the minimum depth required to intersect the water table. This information would then be used to construct an exterior groundwater mitigation system as described below.

As noted above, the construction of the substantially impermeable walls 28 typically creates an underground "dam" to the alluvial groundwater flow against the uphill wall 21. That is, the damming effect causes elevated levels of ground water along the uphill wall 21 which requires measures to prevent adverse flooding conditions. In FIG. 1, overflow conditions result in ground water leaking back into canals. In FIGS. 3, 5, 7 and 9 mistake proofing measures must be in-place to prevent flooding/erosion.

The mitigation system illustrated in FIG. 1 provides for the upstream interception of dammed groundwater and the downstream recharge of the groundwater to simulate or recreate the historic average groundwater levels that existed prior to construction of the reservoir. Due to the relatively higher elevation on the uphill side of the reservoir 25, water will typically flow to the downhill discharge canal/ocean—33 by the action of gravity and without the use of a pump. Thus, the mitigation system operates entirely passively The in-ground barrier described above includes a continuous flow recharging underground routing of alluvial 25 and a variety of improvements over prior art underground (alluvial) reservoirs such as described in both U.S. Pat. Nos. 6,840,710 and 4,326,818 to Willis. Specifically, the use of a natural recharging process that is not limited by a 360 degree enclosure that is keyed into bedrock. The intent is to try to keep costs down by routing ground water to existing infrastructure for distribution/processing.

Thus, the choice of an exclusively in-ground barrier system or the combination of an in-ground barrier system and an open reservoir 33 will depend on the topography (and the potential value of the mineral rights) of the particular parcel of land, as well as the volume of water required to be maintained within the reservoir. While an open reservoir 33 would be subject to evaporative losses as described above, the increased per-acre storage of water may justify the cost of the evaporative losses. That is, while an alluvial reservoir can only store a water volume up to 35 percent of the total reservoir volume, an open reservoir can fill its entire volume with water so that, even with some evaporative losses, the overall percentage of water storage increases with the combined reservoir shown in FIGS. 8 and 9. Such a combined reservoir may be appealing to a municipality that wishes to create not only a new reservoir, but also a park or open space next to a lake setting.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A process for preventing the generally lateral, subterranean migration of fresh water beyond an established perimeter and routing of said fresh water comprising:

determining the subterranean migration of fresh water by use of computer aided modeling of the terrain in combination with a field soil analysis to determine flows base on hydrostatic pressure;

mapping soil permeability as a function of depth to quantify leakage losses due to soil layer consistency;

calculating an insertion depth based on said hydrostatic pressure and said soil layer consistency for positioning of a non-permeable barrier that allows for the maximum interception of said subterranean migration of the fresh water;

making an excavation to said insertion depth to accommodate said non-permeable barrier for maximum interception of the fresh water and allowing for a predetermined leakage loss;

inserting said non-permeable barrier into said excavation;

forming a slurry wall from a soil and bentonite mixture having a permeability rate of about $1.\times 10^{-6}$ cm/sec, said slurry wall maintaining said non-permeable barrier in position;

wherein said barrier wall intersects the flow path of subterranean migration of the fresh water and to route the fresh water to enhance containment said predetermined leakage loss reducing hydraulic pressure said barrier and said slurry wall.

2. The process for preventing the generally lateral, subterranean migration of water beyond an established perimeter according to claim 1 wherein said barrier is selected from the group of plastic sheeting, plastic panels or plastic film.

3. The process for preventing the generally lateral, subterranean migration of water beyond an established perimeter according to claim 1 wherein said barrier includes bentonite clay.

4. The process for preventing the generally lateral, subterranean migration of water beyond an established perimeter according to claim 1 wherein said barrier forms a underground reservoir having a geometric boundary of 3 sides.

5. The process for preventing the generally lateral, subterranean migration of water beyond an established perimeter according to claim 1 wherein said step of forming a slurry wall from bentonite is constructed and arranged for placing hydraulic pressure against the trench walls to prevent the trench from collapsing as it is formed.

6. The process for preventing the generally lateral, subterranean migration of water beyond an established perimeter according to claim 1 wherein said in-ground water table flow direction and amount is based on hydrostatic pressures.

7. The process for preventing the generally lateral, subterranean migration of water beyond an established perimeter according to claim 1 including the step of calculating a rate of soil recharge.

* * * * *